(12) United States Patent
Murphy, Sr.

(10) Patent No.: US 12,049,101 B2
(45) Date of Patent: Jul. 30, 2024

(54) METHOD FOR FIXING A GAME BIRD FAN AND RELATED APPARATUS

(71) Applicant: Raynard Murphy, Sr., Mobile, AL (US)

(72) Inventor: Raynard Murphy, Sr., Mobile, AL (US)

( * ) Notice: Subject to any disclaimer, the term of this patent is extended or adjusted under 35 U.S.C. 154(b) by 915 days.

(21) Appl. No.: 16/930,714

(22) Filed: Jul. 16, 2020

(65) Prior Publication Data

US 2021/0016599 A1   Jan. 21, 2021

Related U.S. Application Data

(60) Provisional application No. 62/876,259, filed on Jul. 19, 2019.

(51) Int. Cl.
*B44C 5/02*  (2006.01)
*A01N 1/02*  (2006.01)
*B44C 5/00*  (2006.01)

(52) U.S. Cl.
CPC .............. *B44C 5/02* (2013.01); *A01N 1/0278* (2013.01); *B44C 5/00* (2013.01)

(58) Field of Classification Search
CPC .......... B44C 5/02; A01M 31/06; G09B 11/00; G09B 19/00
USPC ........................................ 434/81, 82, 96, 97
See application file for complete search history.

(56) References Cited

U.S. PATENT DOCUMENTS

| | | | | |
|---|---|---|---|---|
| 647,339 A | * | 4/1900 | Thompson | G01B 3/56 33/563 |
| 846,006 A | * | 3/1907 | Bryson | B43L 7/00 33/1 A |
| 1,617,024 A | * | 2/1927 | Munsell | G01J 3/528 434/98 |
| 2,516,044 A | * | 7/1950 | Boyle | B41K 3/00 81/9.2 |
| 4,863,537 A | * | 9/1989 | Sadri | B43L 1/126 156/247 |
| 4,884,826 A | * | 12/1989 | Slagsvol | B42D 1/005 281/38 |
| 4,966,461 A | * | 10/1990 | Hooper | G01J 3/522 356/423 |
| 4,980,212 A | * | 12/1990 | Marquis | B42D 15/0093 283/67 |

(Continued)

OTHER PUBLICATIONS

Graph Paper and Grids, Dec. 5, 2012 [retrieved online Oct. 24, 2023] (Year: 2012).*

*Primary Examiner* — Kurt Fernstrom
(74) *Attorney, Agent, or Firm* — Barclay Damon LLP

(57) ABSTRACT

A game bird fan can be created using a fixation template having a plurality of radial lines extending from a center region that define a plurality of spaced grid portions circumferentially arranged in a semicircular pattern. The base of the tail is initially aligned with the center region of the template and each of the tail feathers are individually aligned with the spaced grid regions. The tail feathers are temporarily secured to the template after each individual aligning step. An adhesive or epoxy is applied to the quills of the tail in order to retain the tail fan after which the formed tail can be removed from the template. Optionally, a riser can be disposed on the fixation template and beneath the base of the tail prior to aligning, enabling the created fan to have a curved or bowed configuration.

16 Claims, 17 Drawing Sheets

(56) References Cited

U.S. PATENT DOCUMENTS

| | | | |
|---|---|---|---|
| 5,437,935 A | 8/1995 | Fredeen | |
| D473,806 S * | 4/2003 | Okada | D10/71 |
| 7,204,034 B2 * | 4/2007 | Morton | A01K 87/04 |
| | | | 33/563 |
| 7,255,051 B2 * | 8/2007 | Graham | D05B 21/007 |
| | | | 33/12 |
| 7,784,213 B1 | 8/2010 | Primos | |
| 7,958,834 B2 * | 6/2011 | Matsumoto | D05C 7/02 |
| | | | 112/470.17 |
| 8,168,305 B1 | 5/2012 | Peterson | |
| 8,858,235 B2 | 10/2014 | Bain | |
| D753,219 S * | 4/2016 | Needham | D19/40 |
| 9,877,473 B2 | 1/2018 | Bartel | |
| 2007/0283589 A1 * | 12/2007 | Garcia | G01B 3/10 |
| | | | 33/758 |

\* cited by examiner

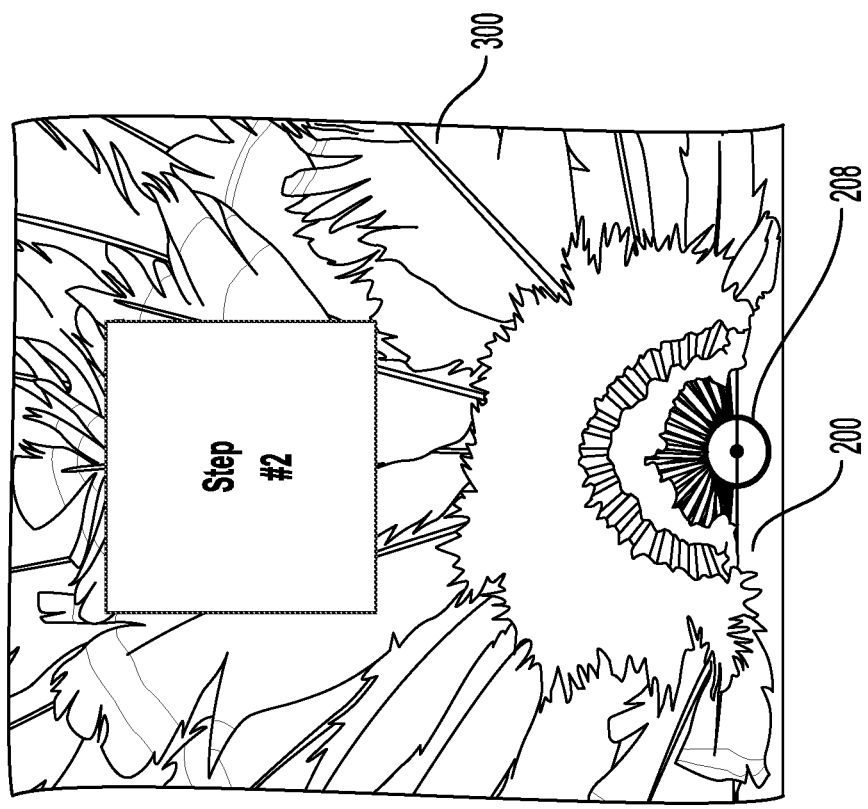

METHOD FOR FIXING A GAME BIRD FAN AND RELATED APPARATUS

CROSS REFERENCE TO RELATED APPLICATION

This application claims priority under applicable law to U.S. Application Ser. No. 62/876,259, filed Jul. 19, 2019, the entire contents of which are incorporated by reference.

TECHNICAL FIELD

This application is directed to an apparatus and method for fixing a game bird tail fan, such as a turkey tail fan, for display or other purposes.

BACKGROUND

Many hunters, taxidermists and other admirers of wildlife commonly fix and display the fanned tails of game birds, such as turkeys, grouse, quail, partridges and/or pheasants.

There is a general and prevailing need in the field to provide a simple and reliable technique that enables a game bird tail to be effectively fixed for purposes of display. A number of fixing and displaying systems are presently known. For example, U.S. Pat. No. 5,437,935 describes a mounting block that receives the tail feathers of a turkey for placement within sets of mounting holes that are arranged on the block. To utilize the mounting block, each of the tail feathers must first individually be pulled from the turkey prior to their placement.

U.S. Pat. No. 8,168,305 describes a turkey fan display device defined by an elongated shank portion made up of a pair of arms that are attached to a center rotatable joint. The end of each arm includes a locking mechanism having a set of grooves that snapfittingly receive quills of the turkey tail. When attached, the display device can act to spread the supported quills into a fan.

U.S. Pat. No. 9,877,473B2 describes a turkey fan decoy that includes a pair of disks secured by a bolt. The disks create a spacing that receives only the skin portion of a turkey tail.

U.S. Pat. No. 8,858,235 describes a device for fixing a turkey tail fan, including a pre-positioning apparatus made up of respective top and bottom sheets, as well as a plurality of fasteners. The turkey tail is positioned between the top and bottom sheets that are fastened to one another. This apparatus requires that the fastened sheets cover at least 25 percent or more of the tail fan.

BRIEF DESCRIPTION

There is a prevailing need to provide a simple and reliable technique for creating a game bird fan. Therefore and according to at least one aspect, there is provided a method for creating a game bird fan, the method comprising disposing a game bird tail onto a template having a grid pattern including a plurality of radially extending lines from a center region, the radially extending lines being spaced to define a plurality of circumferentially spaced grid portions arranged in a semicircular pattern. According to the method, the tail is initially centered onto the fixation template and more specifically relative to a center portion of the template. Each of the tail feathers are then individually aligned with the spaced grid portions of the template and temporarily secured to the template following the aligning step to create a tail fan. An adhesive or epoxy can then be applied to the feather quills at the base in order to permanently retain the formed fan, which can then be removed from the fixation template.

According to another aspect, there is provided a template for creating a game bird fan, the template comprising a grid pattern on one side of the template. The grid pattern is defined by a center region and a plurality of radially extending lines projecting from the center region. The radially extending lines are in spaced relation and define a plurality of circumferential grid portions that are configured and sized to enable the formation of a game bird fan.

One advantage realized by the described method is a simple, inexpensive and reliable technique for fixing a game bird fan, for display or other purposes but without requiring fasteners or a complex fixation structure.

Another advantage is that the herein described method is that the game bird fan can be formed without complex tools and also without occluding or otherwise blocking or hindering the viewability and/or display of at least a portion of the formed fan, which can be made flat or alternatively formed with a bowed or curved configuration.

In addition, the herein described method and template can be applied in regard to literally any game bird, including but not limited to turkeys, quail, partridges, grouse, geese, and pheasants.

These and other features and advantages will be readily apparent from the following Detailed Description, which should be read in conjunction with the accompanying drawings.

BRIEF DESCRIPTION OF THE DRAWINGS

FIG. 3 depicts a placement of a game bird tail placed on the fixation template of FIG. 2(a), and in accordance with aspects of an inventive method;

DETAILED DESCRIPTION

The following relates to an exemplary embodiment of a method for fixing a turkey tail fan for display or other purposes, as well as a fixation template used in the conduction of the method. It will be readily apparent, however, that the herein described method is equally applicable to other game birds, such as but not limited to pheasants, grouse, partridges and quails. Throughout the following description, a number of terms are used in order to provide a suitable frame of reference with regard to the accompanying drawings. It should be noted that these terms should not be interpreted as being overly specific or otherwise limiting of the inventive method and related apparatus, except where so specifically indicated.

In addition, the accompanying drawings are intended to convey as well as depict salient features of the inventive method and apparatus and are not necessarily drawn to scale. Accordingly, the drawings should not be relied upon for scaling or related purposes.

Figure 2A:
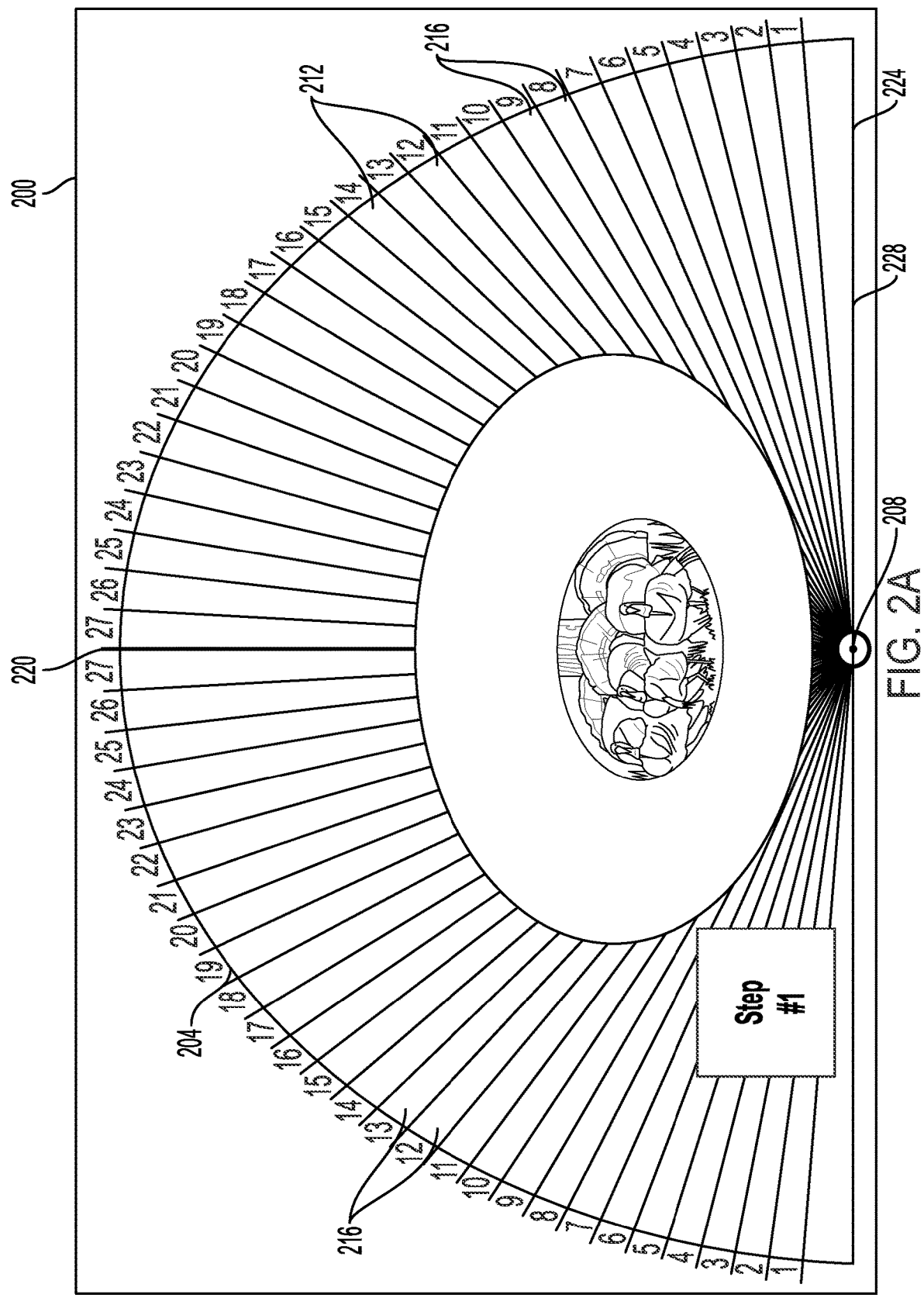
FIG. 2(a) is a top plan view of an exemplary fixation template having a symmetrical grid pattern for use in accordance with the inventive method.

First and with reference to FIG. 2(a), there is shown a fixation template 200, which according to this embodiment is a planar sheet made from paper, mylar, cardboard or another sturdy but flexible material. Use of a flexible material such as mylar is preferred, enabling the fixation template 200 to be wound into a roll for storage. A grid pattern 204 is provided on a facing side of the template 200. This grid pattern 204 is defined by a center region 208, as well as a plurality of radial lines 212 extending outwardly in spaced relation about the center region 208, forming a symmetrical semicircular shape akin to or resembling that of a protractor. The template 200 further includes a peripheral border 224, including a horizontal lower line portion 228 that extends through the center region 208. The radially extending lines 212 define a plurality of evenly spaced grid portions 216 circumferentially defined on opposite sides of the template 200, relative to a vertically extending center line 220, which according to this specific embodiment is highlighted or accented for visibility. According to this specific embodiment, a total of twenty seven (27) grid portions 216 are circumferentially disposed on each side of the center line 220, each of the grid portions 216 being sequentially numbered just outside of the peripheral border 224. According to this exemplary method, each of the circumferentially spaced portions 216 are numbered sequentially on opposing sides of the center line 220 of the template 200 with the lowest grid portions 216A on each side of the grid pattern 204 being marked with the numeral "1" and the uppermost grid portion 216X on each side of the grid pattern 204 being marked as "27" relative to the center line 220. It will be readily apparent that other methods of identification can be used for each or at least some of the spaced grid portions 216.

Figure 2B:
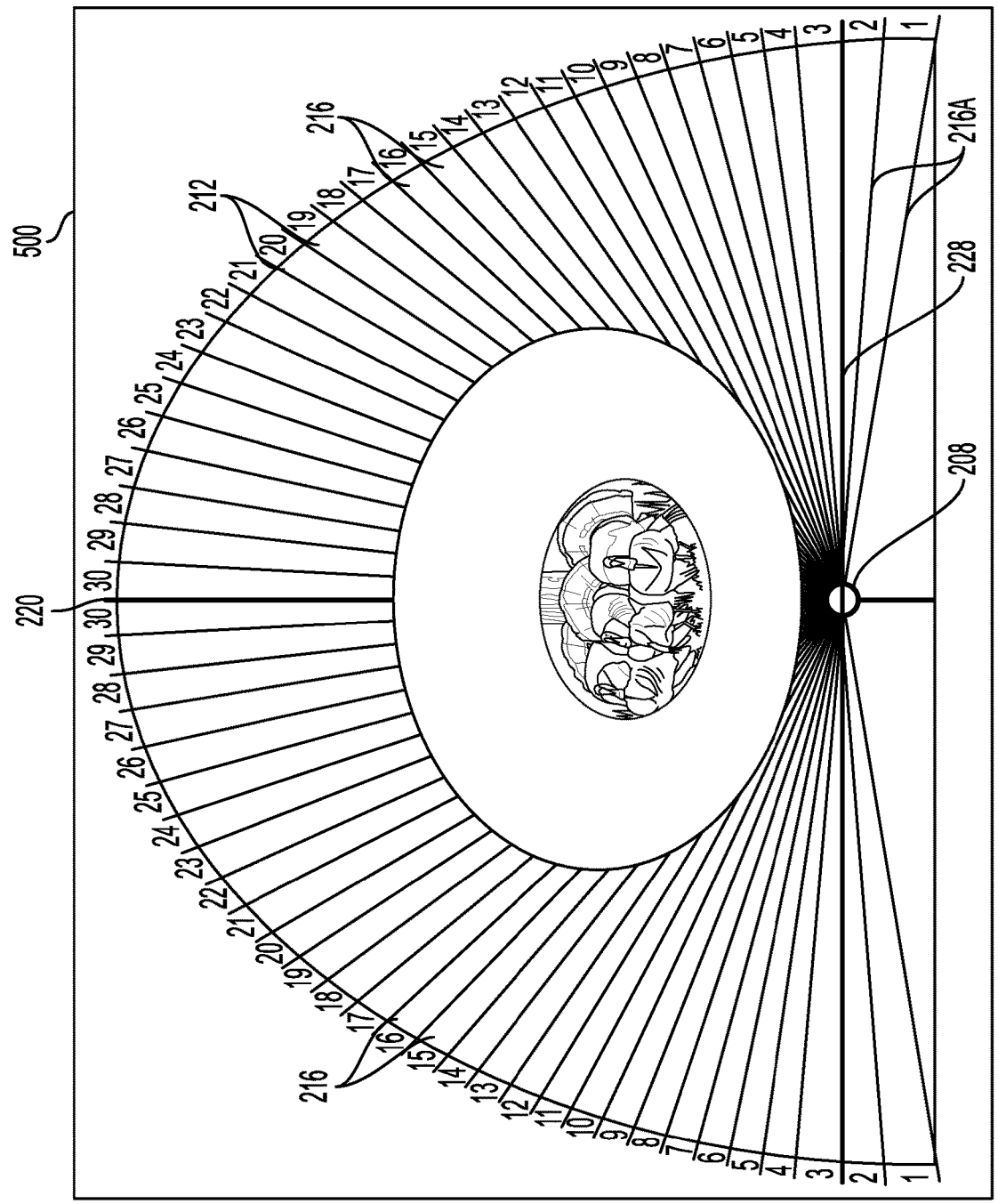
FIG. 2(b) is a top plan view of a fixation template having a symmetrical grid pattern in accordance with another exemplary embodiment.

It should be understood that the relative spacing and number of radially extending lines 212 and spaced grid portions 216 is exemplary and each can be adjusted or varied, for example, depending upon the game bird. For example, a fixation template 500 made in accordance with an alternative embodiment is shown in FIG. 2(b). Similar parts are labeled with the same reference numbers for the sake of clarity. Fixation template 500 is defined by a number of lines 212 radially extending from a center region 208, including a vertically extending center line 220 and a horizontal line 228. A plurality of grid portions 216 are further defined in circumferentially spaced relation about the center region 208 on opposing sides of the vertically extending center line 220. According to this version, additional grid portions 216 are provided below the horizontal lower line 228 in order to create an expanded game bird fan larger than 180 degrees.

An exemplary method is now described based on the fixation template 200, though it will be understood the method is equally applicable for fixation template 500 or variants thereof.

Figure 1:
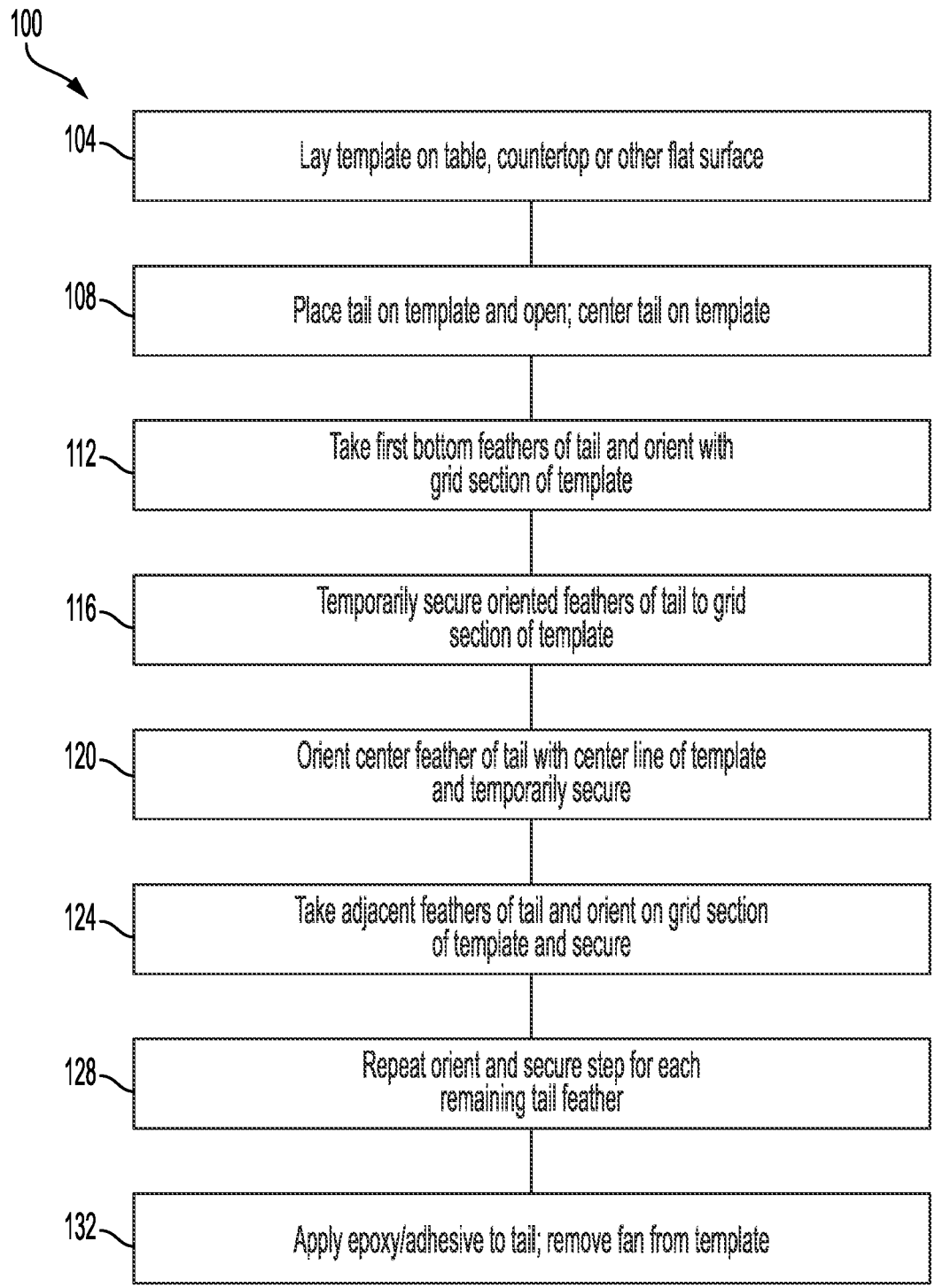
FIG. 1 is a flow chart of a method for fixing a game bird tail in accordance with an exemplary embodiment.

A flowchart 100 of the exemplary symmetrical game bird tail fixing method is provided at FIG. 1. According to a first step 104 and with further reference to FIG. 2(a), the fixation template 200 is first unrolled and set onto a convenient flat surface, such as a table, counter top or the like (not shown) with the grid pattern 204 outwardly facing.

The game bird (i.e., turkey) tail is removed and prepared prior to placement on the template 200. First, the beard is detached by pulling the beard straight out from the body and cutting right at the base of the breast close to the body. The tail fan is then detached by first closing the tail, which will allow the feathers to lay down. Prior to cutting, a decision is made as to how many feathers to keep attached to the fan. Then with a sharp knife, the tail is detached from the body leaving some cover feathers on the front of the tail. It is not necessary to leave any feathers on the back side of the tail.

The game bird tail is laid onto a table and as much meat and fat as possible is preferably scraped from the skin and quills. Once all of the meat and fat has been removed, a knife is used to cut in between each quill to remove the fatty tissue between each quill. A small wire brush can be used to facilitate this latter step, allowing the fan to open more freely. Once the tail fan has been cleaned of all fat and meat, Borax or an equivalent powdered preservative material can be applied and thoroughly rubbed onto the skin and quills, and optionally to the base of the beard. The excess material can be shaken off the tail with the tail now being ready for placement, as herein described.

According to step 108, FIG. 1, of the exemplary method, a prepared turkey tail 300 is initially placed onto the grid pattern 204 of the fixation template 200.

The turkey tail 300 is generally centered onto the grid pattern 204 of the fixation template 200, as partially shown in FIG. 3, with the lower portion of the tail 300 generally coinciding with the lower horizontal line 228 of the peripheral border 224 and the center of the tail 300 generally coinciding with the vertically extending center line 220.

Alternatively, and rather than placing the prepared turkey tail 300 flat against the fixation template 200, the tail 300 can be lifted at the quills at the base 340 of the tail 300 and a riser 410 can be placed to suspend the tail 300 to create a tail fan having a curve or bow. Examples of risers 410 can include a roll of tape placed on its rim or other suitable prop having a sufficient height in order to create the desired curve or bowed configuration. Preferably, a small section of paper 325 is laid onto the center region 208 of the template 200 and a line 217 extensive with the center line 220 of the fixation template 200 is added to the riser 410 and the small section of paper 325 to insure center alignment of the tail 300 relative to the right and left sides of the template 200. Examples of this latter embodiment are depicted in FIGS. 11-16.

Figure 4:
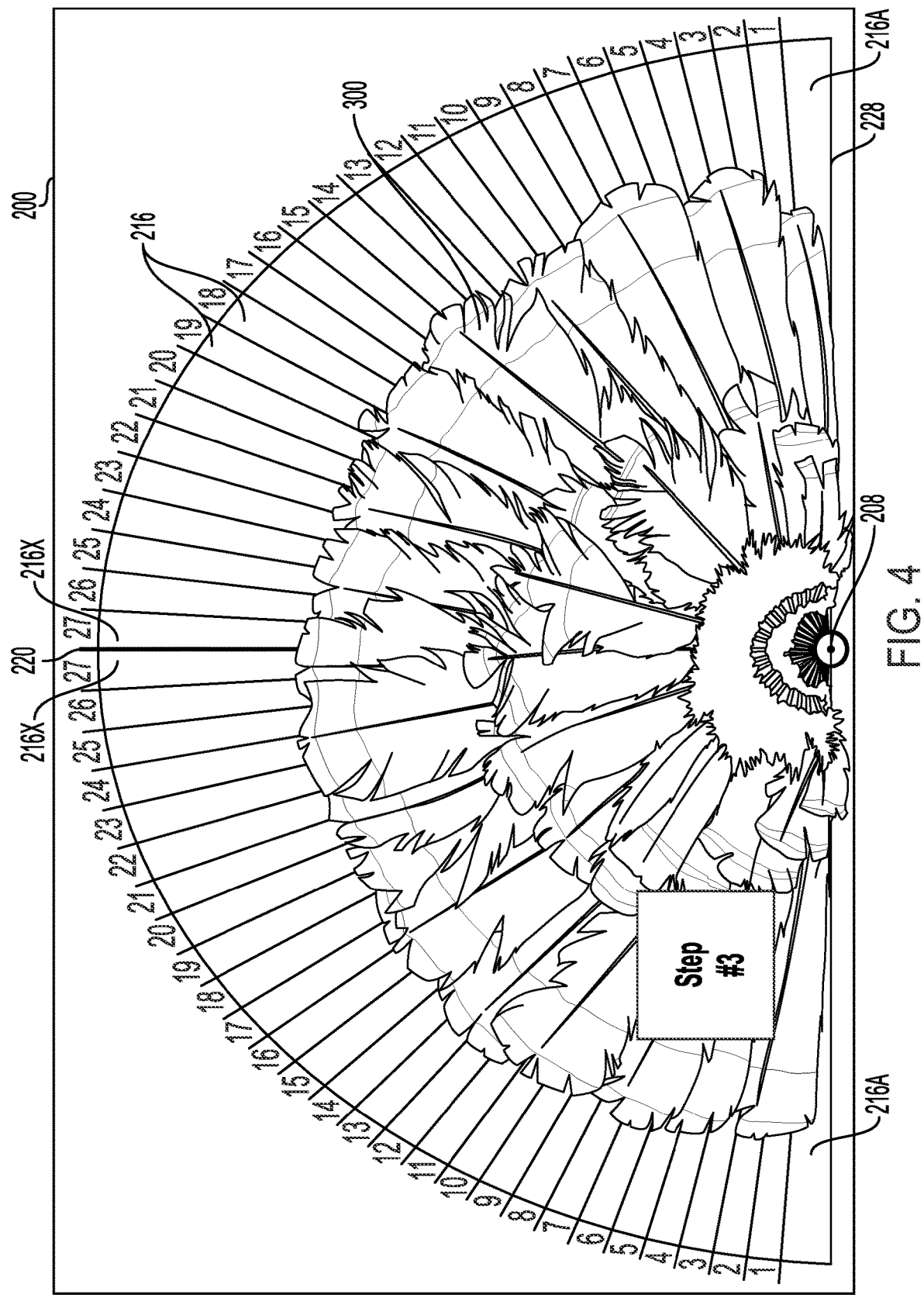
FIG. 4 depicts the game bird tail, as centered on the fixation template of FIG. 2(a), in accordance with aspects of the inventive method.

Irrespective as to whether the tail is laid flat or using a riser and according to step 112, FIG. 1, and as shown in FIG. 4, the tail feathers 304 at the bottom of the turkey tail 300 on the opposing (left and right) sides of the tail 300 are subsequently aligned with the corresponding first spaced grid portions 216A (section 1) of the fixation template 200.

Figure 5:
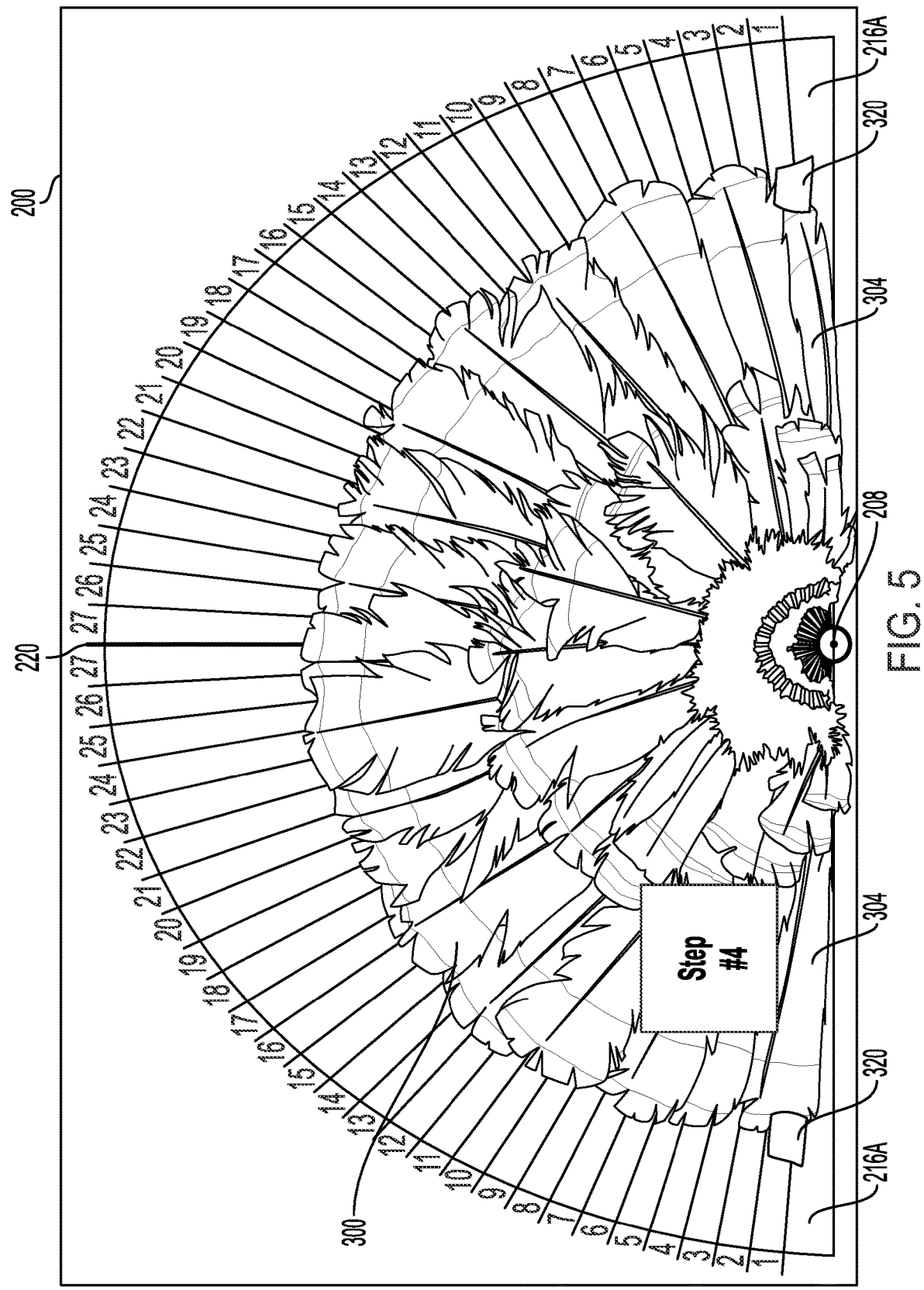
FIG. 5 depicts the orientation of bottom feathers of the game bird tail and their temporary securement to the fixation template of FIG. 2(a), in accordance with aspects of the inventive method.

As shown in FIG. 5, and per step 116, FIG. 1, of the exemplary method, a small section of tape 320, such as painter's tape, is used to temporarily secure the tail feathers 304 to the fixation template 200. The section of tape 320 is preferably secured to the extending tip of each tail feather 304.

Figure 6:
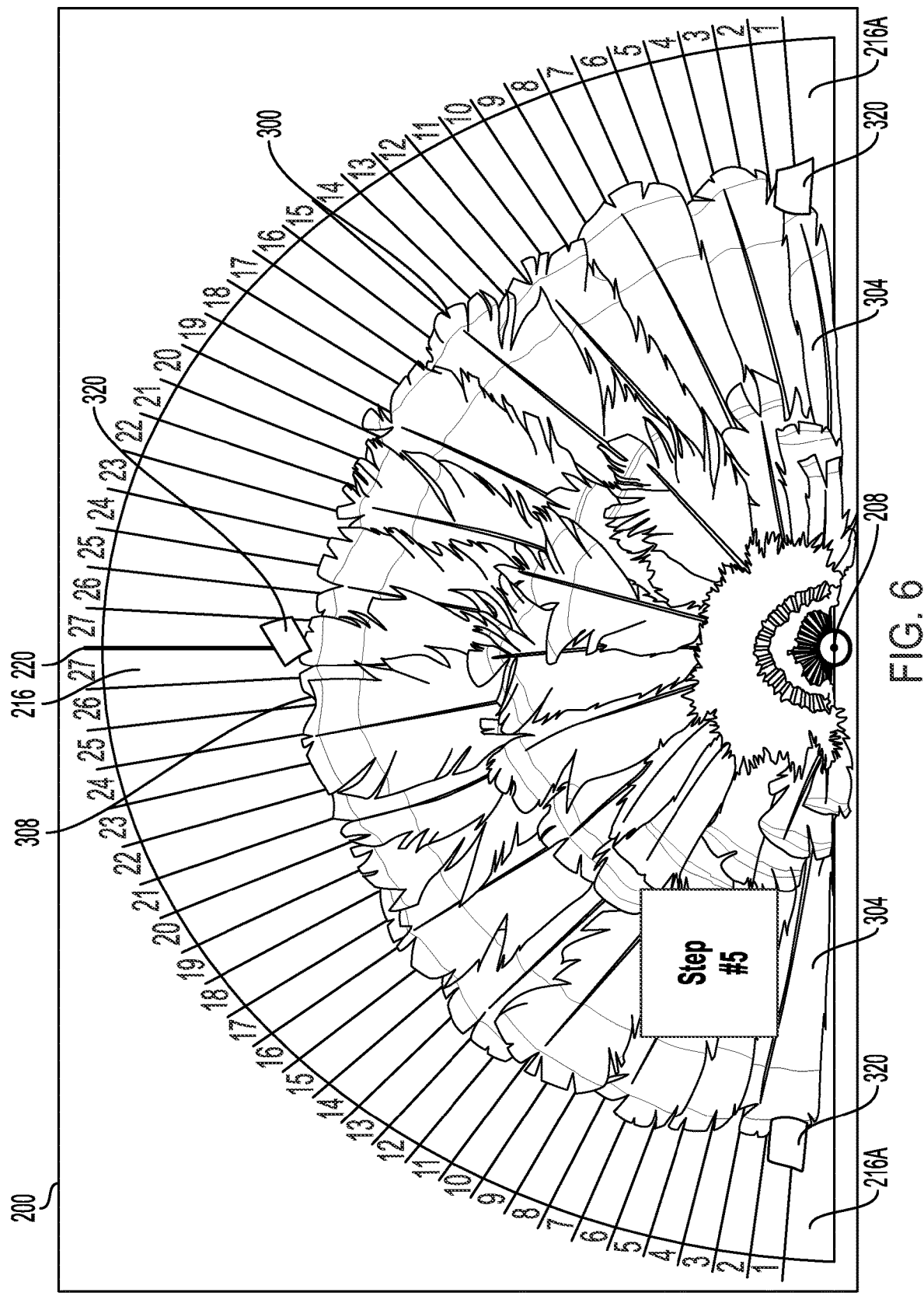
FIG. 6 depicts the orientation and temporary securement of the center feather of the game bird tail to the centerline of the fixation template of FIG. 2(a), in accordance with aspects of the inventive method.

As shown in FIG. 6 and per step 120, FIG. 1, of the exemplary method 100, the center tail feather 308 of the turkey tail 300 is placed on the vertically extending center line 220 of the fixation template 200. The center feather 308 can be secured, for example, using a small section of tape 320 in order to temporarily secure the tail feather 308 to the fixation template 200.

Figure 7:
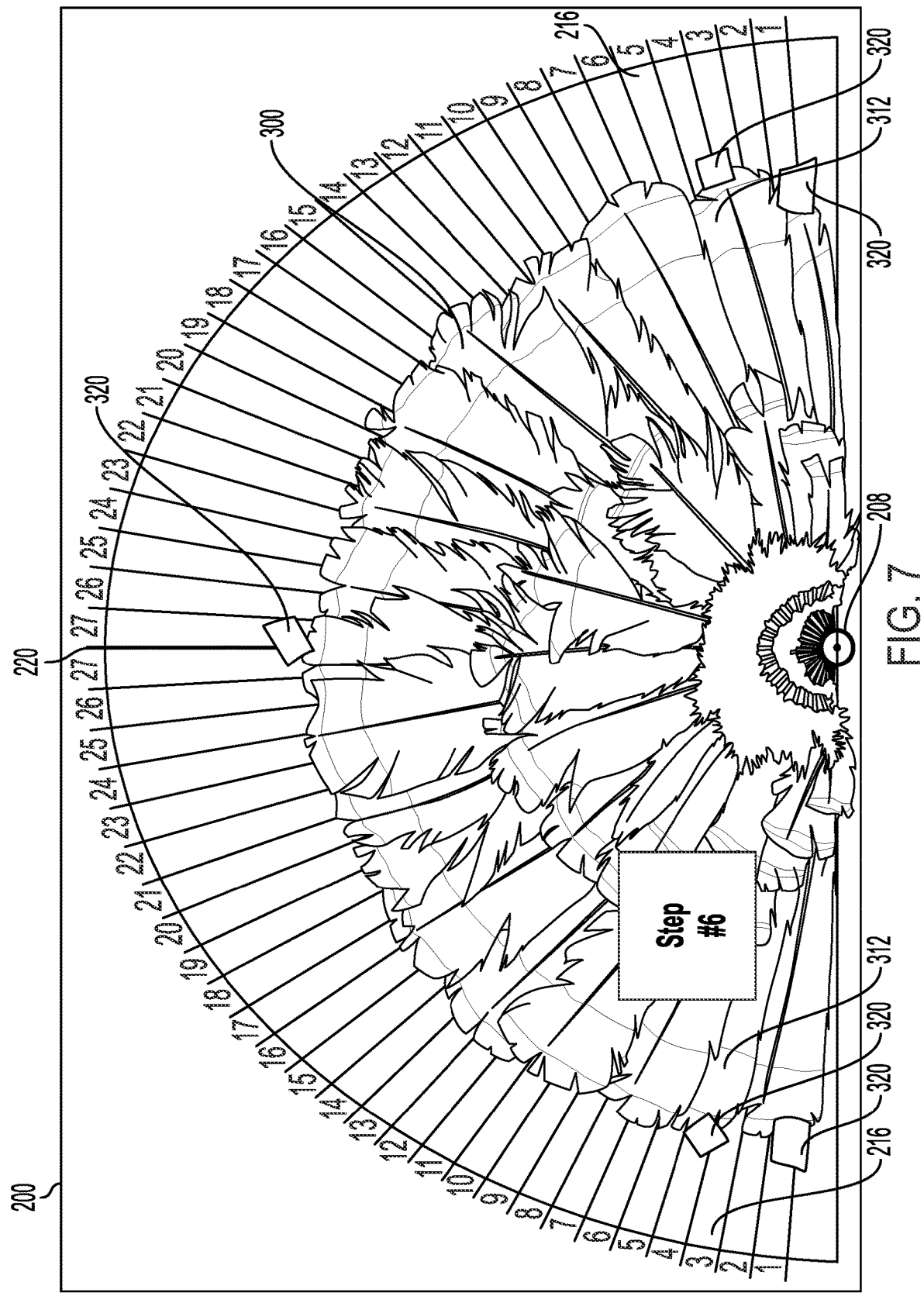
FIG. 7 depicts the orientation and temporary securement of other feathers of the game bird tail to the fixation template of FIG. 2(a), in accordance with aspects of the inventive method.

With reference to FIG. 7 and per step 124, FIG. 1, the tail feathers 312 that are adjacent the aligned lowest tail feathers 304 are now accessed on each of the mirrored left and right sides of the fixation template 200. These tail feathers 312 can be placed on the next numbered grid portion 216 (i.e., number 2) of the fixation template 200 on respective left and right sides thereof, and secured at its tip using a section of tape 320.

Figure 8:
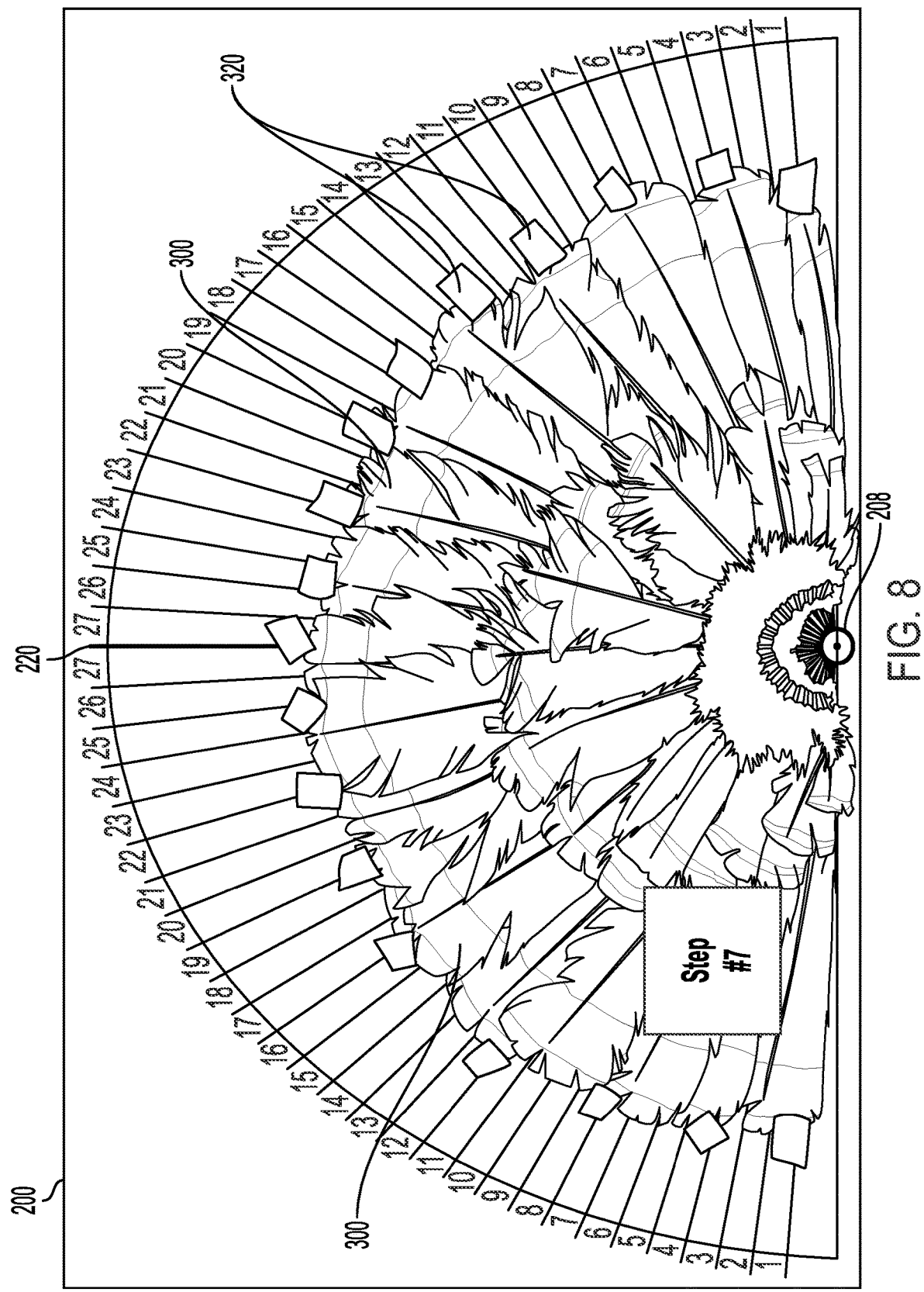
FIG. 8 depicts the orientation and temporary securement of all feathers of the game bird tail to the fixation template of FIG. 2(a), in accordance with aspects of the inventive method.

With reference to FIG. 8 and per step 128, FIG. 1, each of the remaining tail feathers 316 are then individually disposed and arranged to complete the fan, until all of the tail feathers have been symmetrically arranged and temporarily secured to the fixation template 200 and more specifically to the numbered grid portions 216, as shown, on each side of the center line 220.

Figure 9:
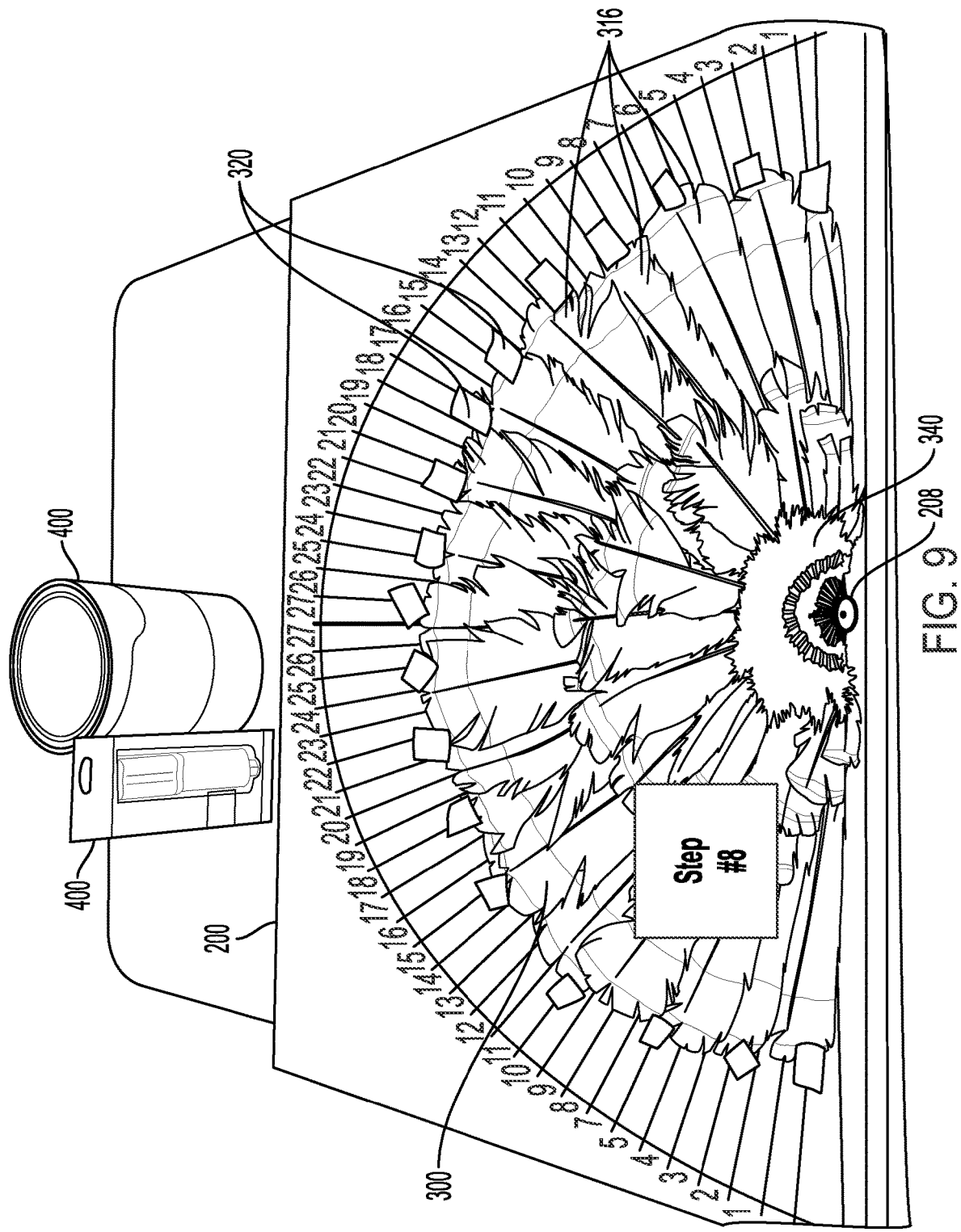
FIG. 9 depicts an epoxying or fixing step of the method of FIG. 1 relative to the game bird tail fan and in accordance with aspects of the inventive method.
Figure 10:
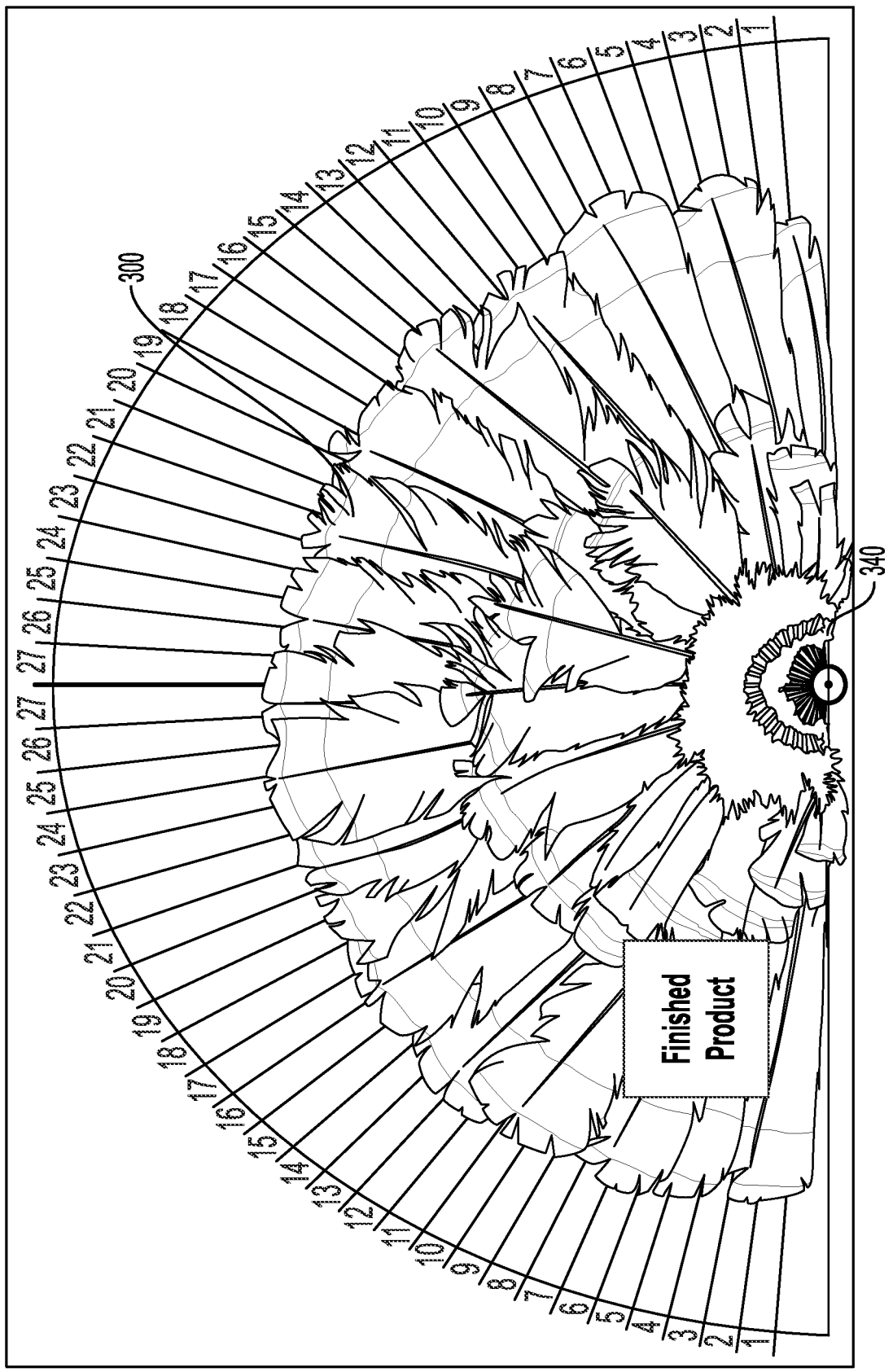
FIG. 10 depicts a fully completed game bird fan made in accordance with the inventive method.
Figure 11:
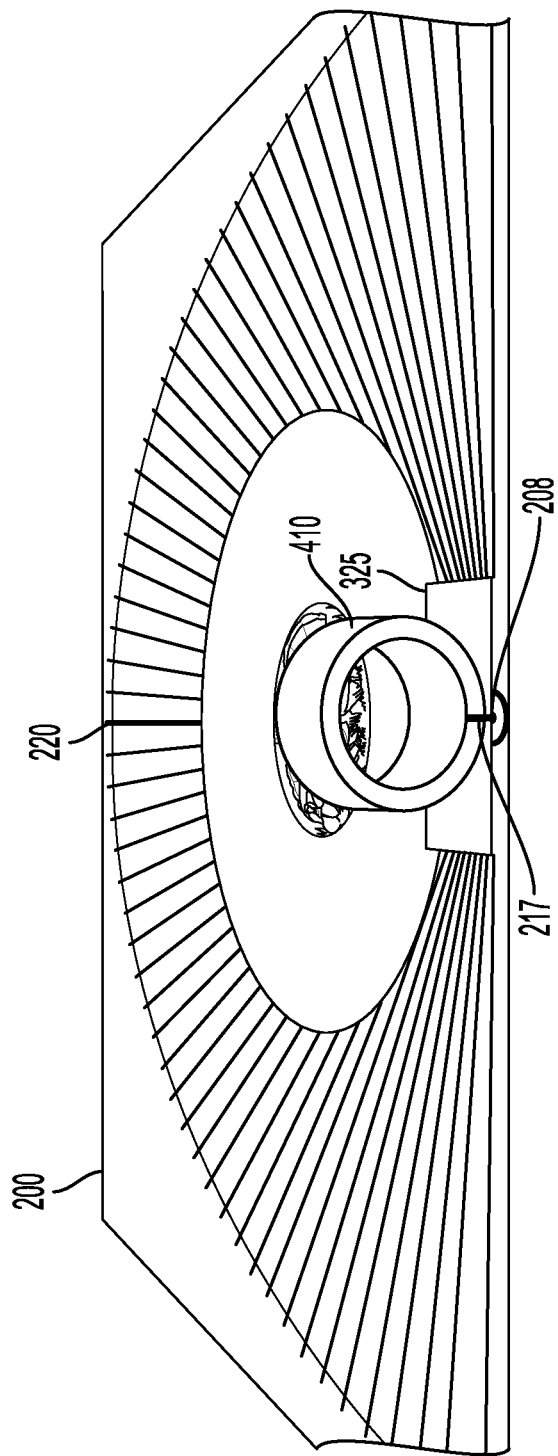
FIGS. 11-16 depict views of a fixation template, as configured with various embodiments of a riser feature, the latter configured to create a game bird fan having a curved or bowed configuration.
Figure 12:
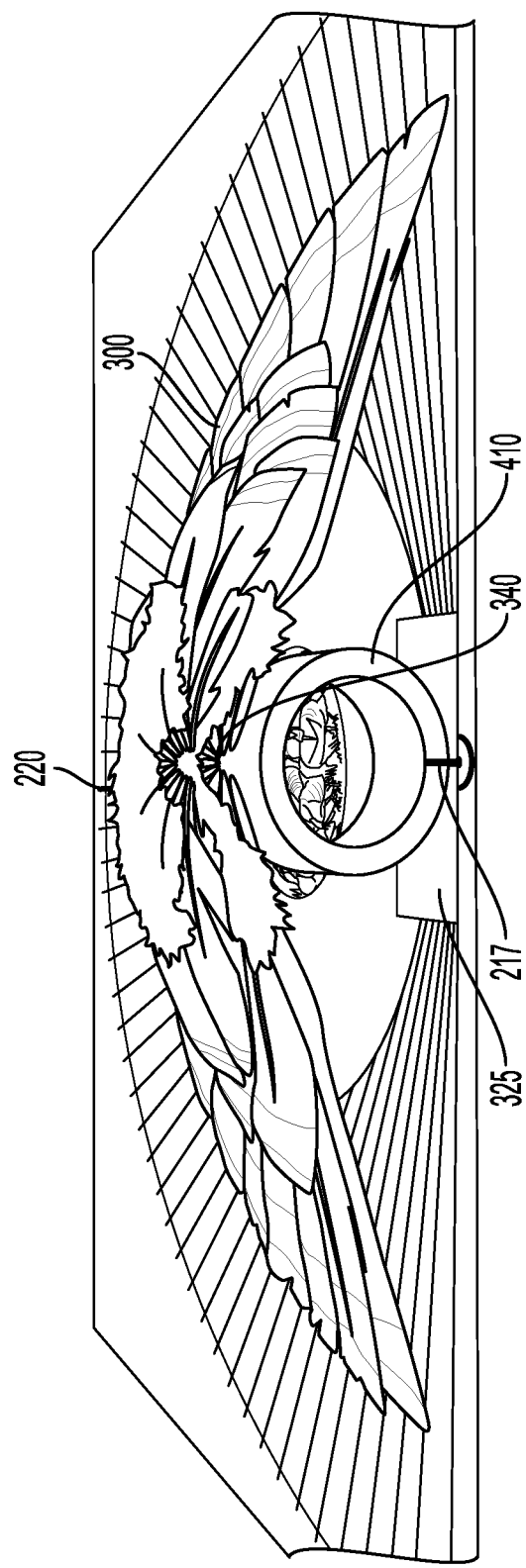
Figure 13:
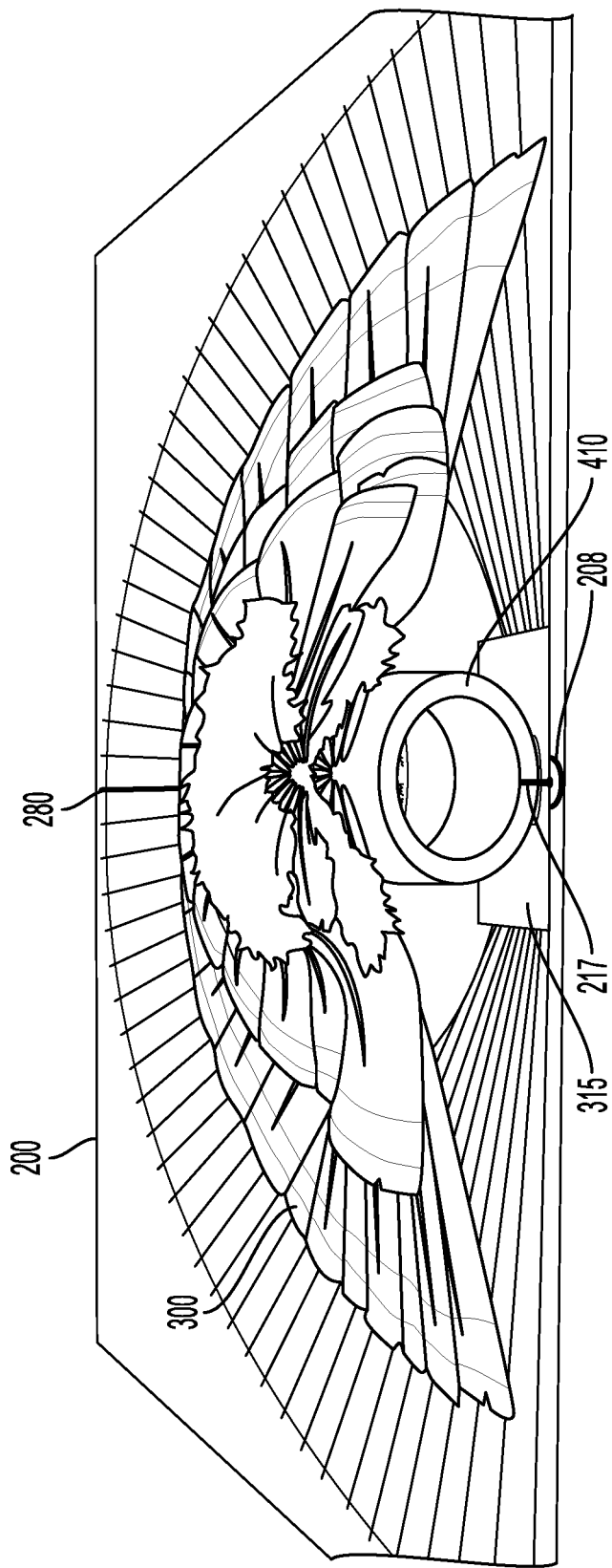
Figure 14:
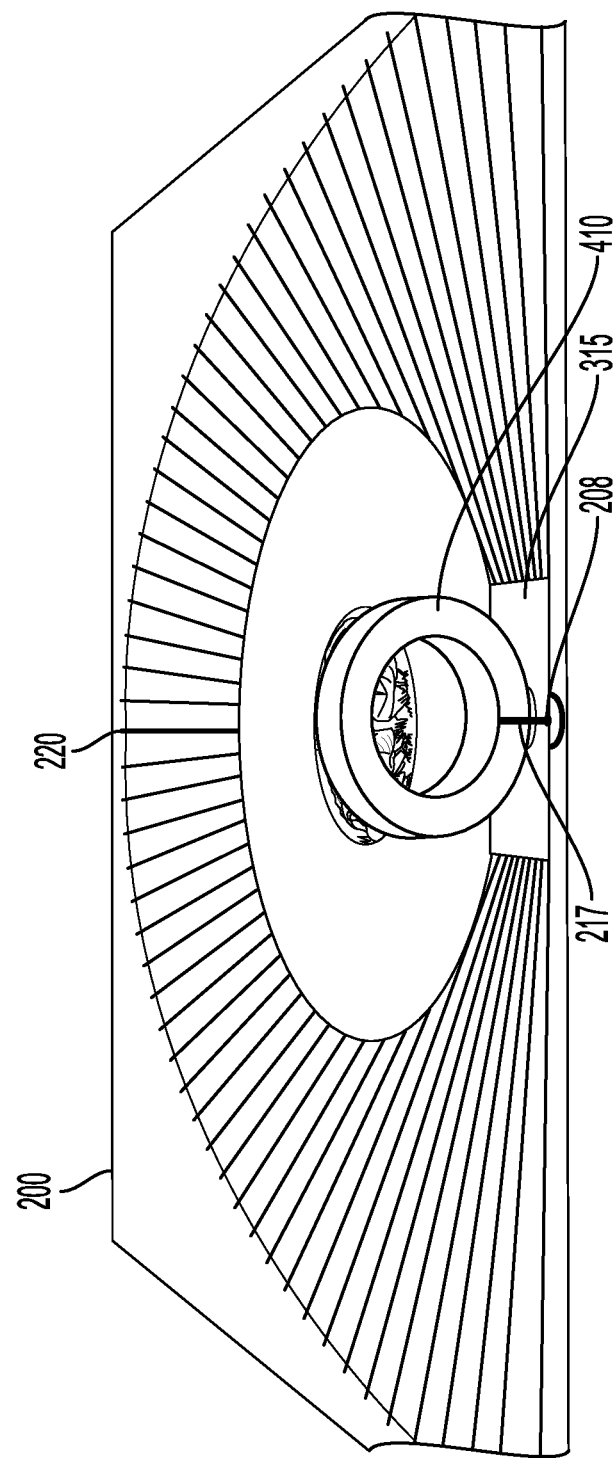
Figure 15:
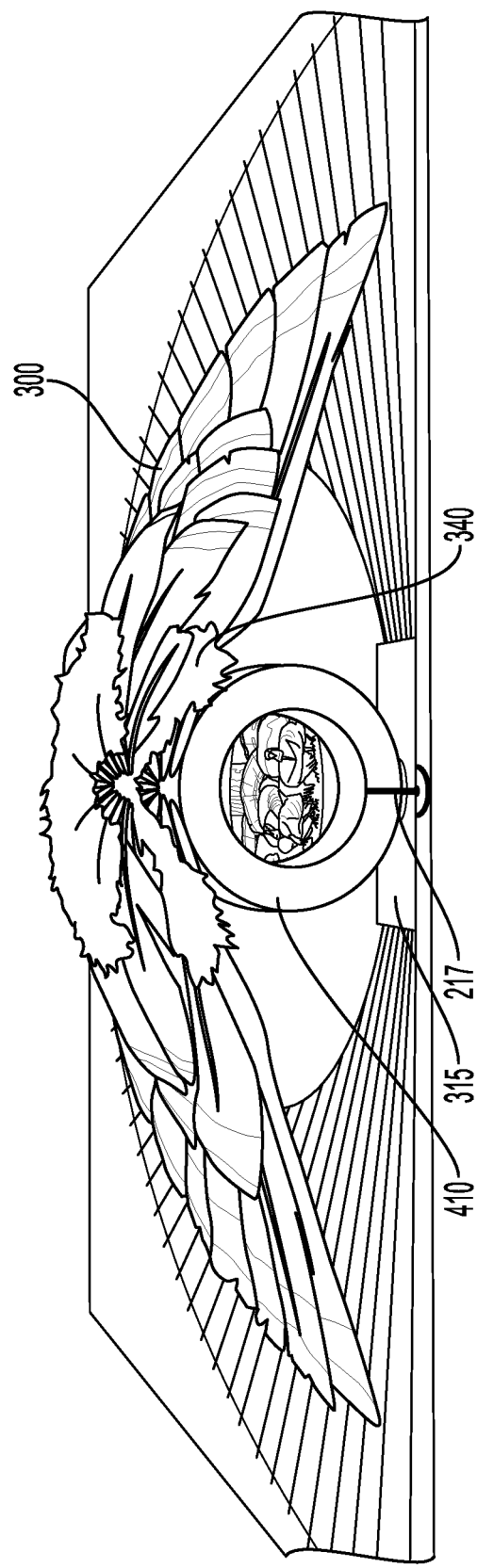
Figure 16:
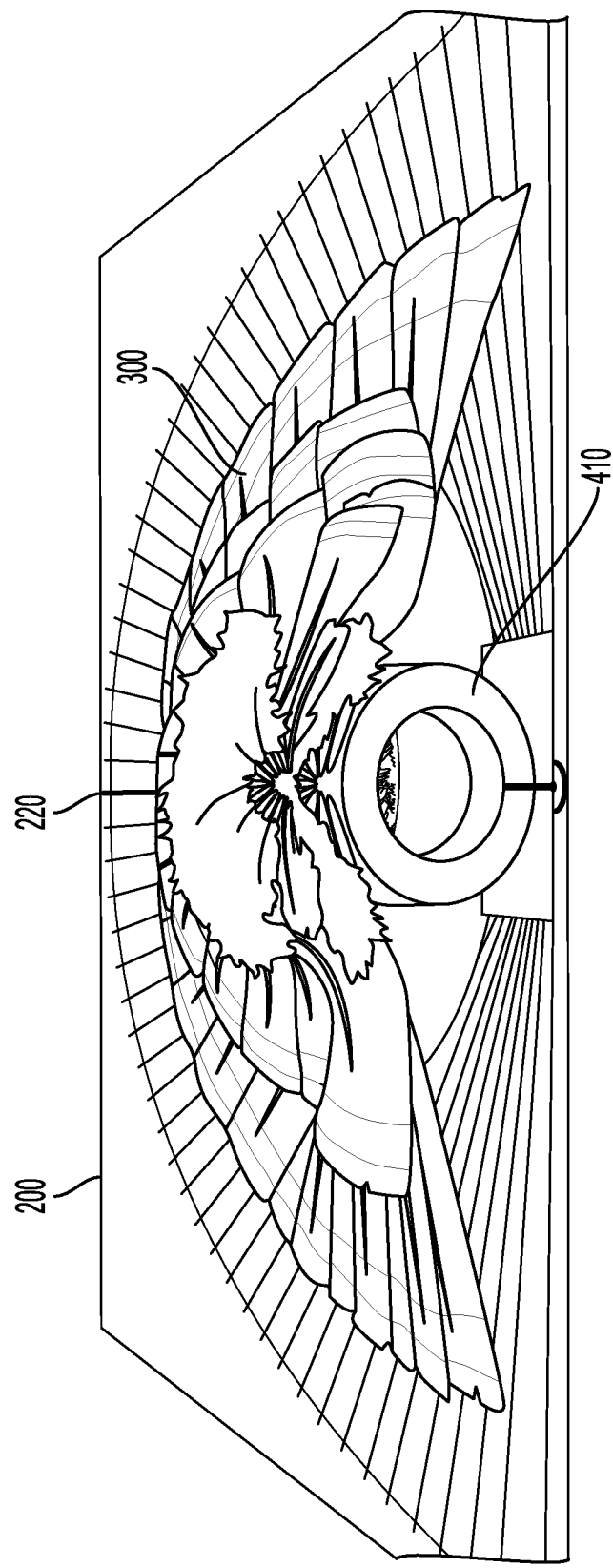

Referring to FIG. 9 and after all of the tail feathers have been secured to the fixation template 200 per step 132, a suitable adhesive or epoxy 400, such as Apoxy or Bondo can be used to secure the feather quills at the base 340 of the turkey tail 300. After the adhesive or epoxy has been cured, each of the sections of tape 320 temporarily retaining the tail 300 can be removed and the formed fan can be removed from the fixation template 200, as shown in FIG. 10.

A game fan using the fixation template 500, FIG. 2(b), is similarly formed in accordance with the herein described method, although with an overall pattern that is greater than 180 degrees based on the grid portions 216 additionally provided below the lower horizontal line 228. In creating the game bird fan, the base of the game bird tail is again disposed onto the center region 208 and the tail feathers are temporarily secured beginning with grid portion 216A below the horizontally extending line 228 on opposing sides of the center line 220. Otherwise, the game bird fan is then created as previously described. Each of the fixation templates 200, 500 can further include a riser option to produce a curved or bowed configuration, as shown in FIGS. 11-16.

PARTS LIST FOR FIGS. 1-16

100 flowchart
104 step
108 step
112 step
116 step
120 step
124 step
128 step
132 step
200 fixation template
204 grid pattern
208 center portion, template
212 radially projecting lines
216 circumferentially spaced grid portions
217 line, added
220 center line, template
224 peripheral border, template
228 lower horizontal line, template
300 turkey tail
304 lowermost tail feathers
308 center tail feathers
312 second tail feathers
316 remaining tail feathers
320 tape sections
325 small section of paper
340 base, tail
400 adhesive or epoxy
410 riser
500 fixation template These and other variations and modifications are within the intended scope of the recited invention and in accordance with the claims that follow.

The invention claimed is:

1. A method for creating a game bird tail fan, the method comprising:
   disposing a game bird tail onto a fixation template, the fixation template having a plurality of radial lines outwardly extending from a center region, the radially extending lines being spaced to define a plurality of spaced grid portions arranged in a semicircular pattern;
   centering the game bird tail onto the fixation template with a base of the tail being disposed on the center region;
   individually aligning each of the tail feathers of the game bird tail with the spaced grid portions of the fixation template to create a tail fan;
   temporarily securing the tail feathers to the grid portion of the fixation template after each aligning step;
   applying adhesive to the tail to retain the tail fan; and
   removing the formed tail fan from the fixation template.

2. The method as recited in claim 1, in which the game bird is from the group including at least one of a turkey, quail, partridge, grouse or pheasant.

3. The method as recited in claim 1, wherein the tail fan is retained by applying an adhesive or epoxy to the feather quills at the base prior to removing the tail fan from the fixation template.

4. The method as recited in claim 1, further comprising placing a riser on the fixation template and then disposing the base of the game bird tail on the riser to create a tail fan having a bowed or curved configuration.

5. A fixation apparatus for creating a game bird fan, the fixation apparatus comprising:
   a fixation template comprising a grid pattern made up of:
      a center region; and
      a plurality of radially extending lines projecting from the center region wherein the radially extending lines are in spaced relation and define a plurality of circumferentially spaced grid sections disposed about the center region in which the fixation template receives a game bird tail, the game bird tail being placed onto the fixation template.

6. The fixation-apparatus as recited in claim 5, in which the fixation template is made from at least one of paper, mylar or cardboard.

7. The fixation apparatus as recited in claim 5, further comprising a riser configured to be placed under the base of the game bird tail placed on the fixation template, enabling a tail fan having a curved or bowed configuration.

8. The fixation apparatus as recited in claim 5, in which the fixation template further includes a vertically extending center line and a horizontal extending line, each line extending through the center region.

9. The fixation apparatus as recited in claim 8, in which at least one grid portion extends below the horizontally extending line.

10. The fixation apparatus as recited in claim 5, in which the the game bird tail is from a group including at least one of a turkey, quail, partridge, grouse or pheasant.

11. The fixation apparatus as recited in claim 5, further comprising a plurality of adhesive strips configured for temporarily securing the game bird tail to the fixation template.

12. A fixation apparatus for creating a game bird fan, the fixation apparatus comprising:
  a fixation template that includes a grid pattern comprising:
    a center region; and
    a plurality of radially extending lines projecting from the center region wherein the radially extending lines are in spaced relation and define a plurality of circumferentially spaced grid sections disposed about the center region in which the fixation template is sized to receive a game bird tail; and
  a riser configured to be placed under the base of a game bird tail placed on the fixation template, enabling a tail fan having a curved or bowed configuration.

13. The fixation-apparatus as recited in claim 12, in which the fixation template is made from at least one of paper, mylar or cardboard.

14. The fixation apparatus as recited in claim 12, in which the fixation template further includes a vertically extending center line and a horizontal extending line, each line extending through the center region.

15. The fixation apparatus as recited in claim 14, in which at least one grid portion extends below the horizontally extending line.

16. The fixation apparatus as recited in claim 12, in which the fixation template is sized to receive a game bird tail from the group including at least one of a turkey, quail, partridge, grouse or pheasant.

* * * * *